(No Model.)
F. W. STARR.
TOOL FOR CUTTING SLOTS OR KERFS IN WOOD, &c.
No. 345,397. Patented July 13, 1886.
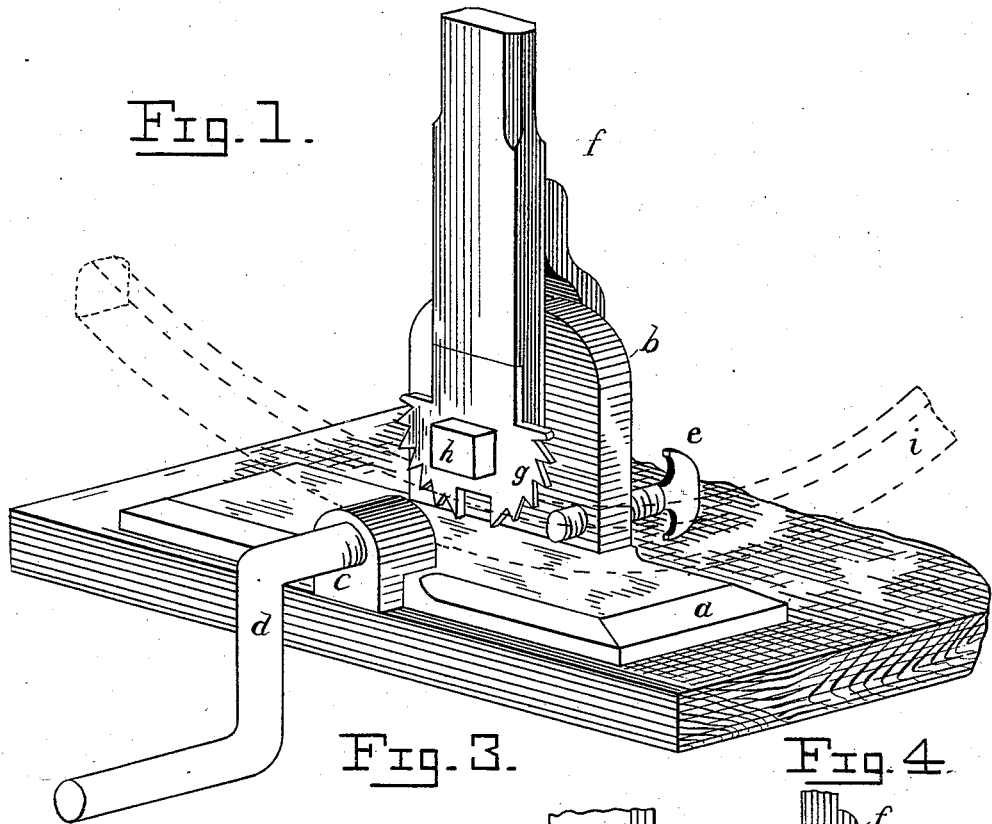
Fig. 1.
Fig. 3. Fig. 4.
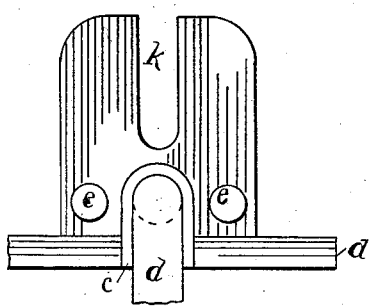
Fig. 2.
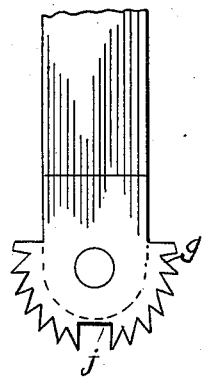
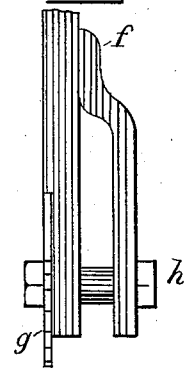
Attest.
Fred State
Thomas Wall
Inventor.
Ferdinand Wm Starr.

UNITED STATES PATENT OFFICE.

FERDINAND WILLIAM STARR, OF SPRINGFIELD, OHIO.

TOOL FOR CUTTING SLOTS OR KERFS IN WOOD, &c.

SPECIFICATION forming part of Letters Patent No. 345,397, dated July 13, 1886.

Application filed October 24, 1885. Serial No. 180,831. (No model.)

*To all whom it may concern:*

Be it known that I, FERDINAND WILLIAM STARR, of Springfield, in the county of Clark and State of Ohio, have invented a new and useful Tool for Cutting Slots or Kerfs into Wood or other Material, of which the following is a specification.

The parts composing this tool consist of a base-plate having vertically-projecting lugs with set-screws passing laterally through them for purposes of adjustment, and a bifurcated handle having fixed thereto a cutter, and a pivot-bolt passing transversely through it and the forked ends of the handle.

The main object of this invention is to provide a simple tool with which segmental slots can be conveniently cut into rims for wheels, the slots so cut being for the reception of a segmental web projecting from a spoke-socket, for which a patent was granted me September 30, 1884, No. 305,978, though the machine or tool may also be used for various other purposes.

Referring now to the drawings, Figure 1 is a perspective view, showing the tool fastened to a bench, the dotted lines indicating a felly or rim in position to be operated upon. Fig. 2 is the base-plate, showing a front elevation of the vertically-projecting lugs. Fig. 3 is a front elevation, showing the cutter or saw attached to the handle or operating-bar. Fig. 4 is a side elevation, showing the bifurcated handle with cutter attached and a pivot-bolt passing through them.

In the drawings like letters of reference indicate like part.

In Fig. 1, $a$ is the base of the tool; $b$, a flat slotted vertical projection, upon which the forked handle $f$ is reciprocated and vibrated in the operation of cutting into the rim $i$. $e$ indicates adjusting-screws. $c$ is a vertical projecting lug, perforated and threaded to receive a crank or hand-screw, $d$, by which the rim is firmly held in position while being cut into; $g$, the cutter or saw attached to the handle $f$, and $h$ the pivot-bolt passing through the same.

It is clearly shown in Figs. 1 and 3 that the cutter or saw $g$ has its teeth cut in opposite directions, and a large portion between said oppositely-inclined teeth being cut out, as is indicated at $j$, Fig. 3. The object of this peculiar-shaped cutter $g$ is to prevent the teeth from slivering or tearing the work operated upon, as the cutter is rotated in opposite directions. The recess $j$ is made into the cutter to prevent choking up the teeth of the cutter, and also to carry out in opposite directions the chips accumulating therein.

It will be evident that the slow motion necessary in operating the tool by hand would not make a clean cut were the teeth of the cutter $g$ all in one direction.

To operate this tool all that is necessary is to adjust and clamp the rim $i$ between the vertically-projecting lugs $b$ and $c$, and then place the handle $f$ straddling the flat vertical slotted projection $b$, so that the pivot-bolt $h$ has its bearing in the slot $k$, Fig. 2. Then let the handle $f$ with cutter $g$ down until it rests upon the rim $i$. Then by moving the handle in opposite directions a segmental slot or kerf will be cut into the work, the pivot-bolt $h$ and handle $f$ having a downward or forward motion as fast as the cutting proceeds. Of course the rim might be moved toward the cutting-edge of the tool, which would only be a reversal of that described, and would make the tool more complicated.

I would say, further, that it is not absolutely necessary that the handle $f$ terminate in a fork, as a large head or washer upon the pivot-bolt $h$ would answer a similar purpose. Neither is it necessary that the pivot-bolt $h$ (see Fig. 4) should pass through the cutter $g$. The essential features in the combination of the handle and serrated cutter and the pivot-bolt $h$ consist in the attachment of cutter $g$ to a bar, substantially as shown, said bar or handle having a pivot upon which the cutter and handle are reciprocated and rotated when placed upon the vertical projection $b$, Fig. 1.

In the accompanying drawings I have not shown any stop by which the depth of kerf may be regulated, as it is quite natural that such a provision would be made in constructing the tool. An adjusting-stop could be placed in the slot $k$, Fig. 2, permitting the pivot $h$, Fig. 4, to slide down only a certain distance. Said stop could be moved up or down to suit the requirements of depth the cutter should penetrate the work.

I am aware of mortising rotary cutters, patent of Oppenheimer, No. 307,065, October 21, 1884, reissued October 27, 1885, No. 10,655, in which oscillating motion is imparted to segmental cutters by continous rotary motion produced by the mechanism described and shown, and in which the teeth of the segmental cutters incline in opposite directions from the middle of said cutters, as also shown and described. My invention differs from these patents in that the cutter bar or handle is oscillated and reciprocated without the intervention of other mechanism, the object being great simplicity of construction and cheapness; but the chief and important features of difference consist in that the teeth of this cutter incline the reverse of those in the Oppenheimer patents, and practically for a different purpose—namely, for cutting inwardly, and with the grain or fiber of the wood from opposite sides—by which a clean kerf or mortise is produced, which could not be attained with the cutters referred to, and shown in the Oppenheimer patents, the direction of the teeth being unfavorable, whether cutting slots into rims for wheels or other material lengthwise of the wood, as shown and described in the foregoing specification. I do not claim any oscillating mortising-cutter whose cutting edge or teeth diverge from the middle of the cutter in opposite directions; but What I do claim, and desire to secure by Letters Patent, is—

1. A tool for cutting segmental slots or kerfs into rims for wheels or other material, the tool consisting, essentially, of a base-plate, $a$, having vertically-projecting lugs $b$ and $c$, adjusting-screws $e$, and crank-screw $d$, in combination with a bifurcated handle, $f$, the same having fastened thereto a cutter, $g$, whose teeth incline in opposite directions, and having an open space, $j$, between the oppositely-inclined teeth, substantially as described, and for the purposes set forth.

2. In a tool for cutting slots or kerfs into wood or other material, the combination of a base-plate, $a$, having vertical projections $b$ and $c$, and screws passing through said projections, for purposes of adjusting and holding the work while being operated upon, in combination with a pivoted handle or bar having attached thereto at or near the pivot a cutter whose teeth incline in opposite directions, and having an open space between said oppositely-inclined teeth, substantially as and for the purposes described.

3. In a tool for cutting segmental slots or mortises, a bar or handle having fixed at its lower extremity a pivot or bearing upon which the handle may be reciprocated and oscillated, in combination with a cutter whose teeth or cutting-edges incline and face each other convergently, substantially as shown, and for the purpose described.

4. In a tool for cutting slots, constructed substantially as herein described and shown, a frame provided with bearings, and in combination with said frame a handle so pivoted as to be adapted to be oscillated and reciprocated upon it, the said handle having attached to or near its pivot a cutter or cutters, the cutting-edges of which incline toward each other, and an open space being provided between said convergently-inclined teeth or cutting-edges, for the purpose of clearing the slot of chips, and to prevent choking of the cutting-edges in the operation of cutting.

FERDINAND WM. STARR.

Witnesses:
WM. EDMISTON,
CHASE STEWART.